(No Model.)
W. L. CHURCH & S. A. REEVE.
APPARATUS FOR MAKING ICE.
No. 530,494. Patented Dec. 4, 1894.
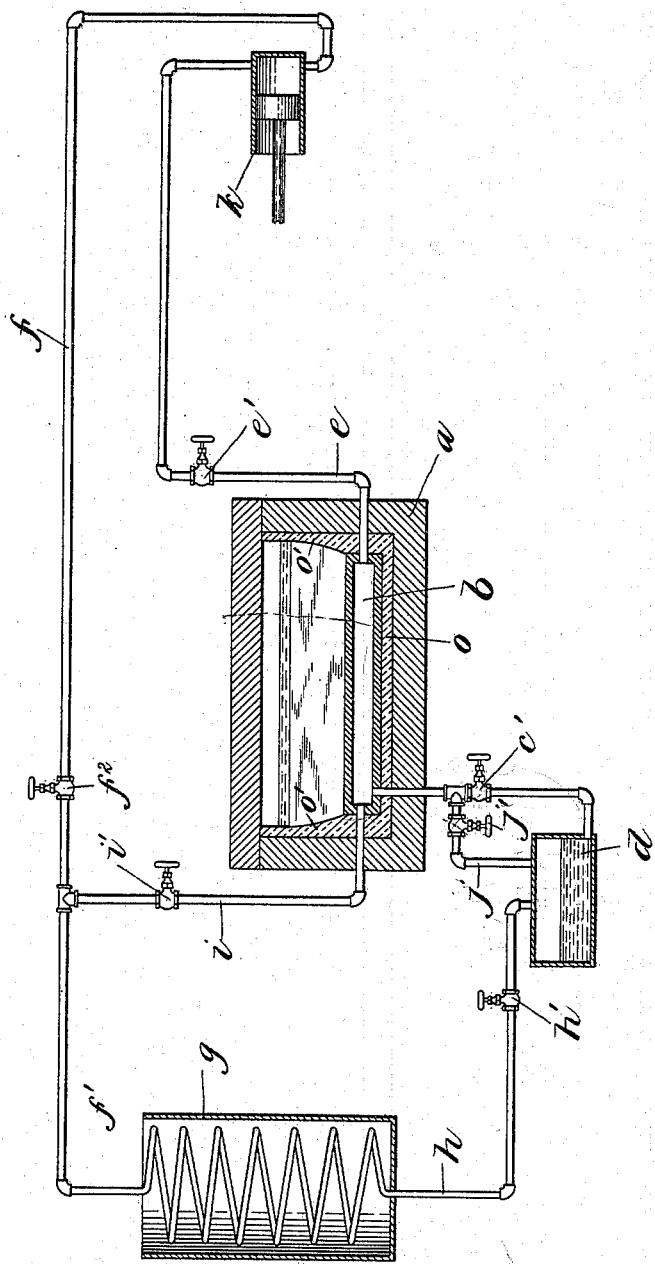
Witnesses:
Arthur H. Abell.
A. D. Harrison.
Inventors:
Wm Lee Church
S. A. Reeve
by Wright Brown Crosby
Attys.

UNITED STATES PATENT OFFICE.

WILLIAM LEE CHURCH, OF NEWTON, AND SIDNEY A. REEVE, OF BOSTON, MASSACHUSETTS, ASSIGNORS TO THE WESTINGHOUSE, CHURCH, KERR & COMPANY, OF JERSEY CITY, NEW JERSEY, AND NEW YORK, N. Y.

APPARATUS FOR MAKING ICE.

SPECIFICATION forming part of Letters Patent No. 530,494, dated December 4, 1894.

Application filed January 25, 1894. Serial No. 498,011. (No model.)

*To all whom it may concern:*

Be it known that we, WILLIAM LEE CHURCH, of Newton, in the county of Middlesex, and SIDNEY A. REEVE, of Boston, in the county of Suffolk, State of Massachusetts, have invented certain new and useful Improvements in Apparatus for Making Ice, of which the following is a specification.

This invention relates to the manufacture of ice by the introduction of a volatile liquid into a freezing bed or plate, where said liquid is expanded into gas and thus caused to remove heat from a body of water in contact with said bed or plate, the gas being continuously removed as fast as formed.

The invention has particular reference to the freezing on and liberation of the cake of ice from the generating surface of the bed or plate, and has for its object to provide a simple and effective means whereby the cake may be very quickly frozen on and very quickly liberated from said surface.

The invention consists in certain improvements in the apparatus looking to the rapid freezing of the ice, the introduction of the vapor into a condensable bed, and the removal of the liquid of condensation therefrom, before the recommencement of freezing, all of which we will now proceed to describe and claim.

The accompanying drawing represents a sectional elevation showing an ice-forming apparatus embodying our invention.

In the drawing, $a$ represents a tank adapted to contain a body of sweet water to be frozen, and $b$ represents an ice generating plate or bed which is here shown as placed horizontally at the bottom of the tank. It will be understood, however, that the bed may be placed vertically, so that both of its sides will act as generating surfaces, forming two cakes simultaneously, as in the well-known operation of plate freezing. Hence, while hereinafter we shall allude to the part $b$ as a bed, it will be understood that this term includes the generating device known as a plate, as well as a bed.

The bed may be of any suitable construction, and is provided with a pipe $c$ for the admission of a volatile liquid such as ammonia from the receiver $d$, and with a large pipe $e$ for the removal of gas, said pipe communicating with a compressor $k$, which acts in a manner well known in ice making to continuously withdraw the gas from the bed during the freezing operation, and to force the same in a compressed condition and under a relatively high temperature through a pipe $f$ to a condenser, which as here shown comprises a coil $f'$ constituting an extension of the pipe $f$, and a receiver $g$ surrounding said coil and holding cold water in contact therewith. The liquid of condensation formed in the condenser passes by the pipe $h$ to the liquid receiver $d$.

The parts above described comprise an ice machine or apparatus operating on the principle of introducing a volatile liquid into the bed, expanding the same into gas in the bed, continuously removing the gas from the bed; then compressing and condensing the gas and returning the liquid of condensation to the primary receiver.

In carrying out our invention, we provide a pipe $i$ connecting the pipe $f$ with the bed $b$, said pipe having a valve $i'$ whereby it may be closed. We further provide a pipe $j$ connecting the pipe $c$ with the upper portion of the liquid receiver $d$, said pipe $j$ having a valve $j'$, whereby it may be closed. The pipe $c$ that connects the lower part of the receiver $d$ with the bed $b$ has a valve $c'$, commonly known as the expansion valve, below its point of connection with the pipe $j$, whereby the lower portion of the liquid receiver may be shut off from the bed $b$. The pipe $e$, connecting the bed with the compressor, has a valve $e'$ whereby the escape of gas from the bed may be prevented, and the pipe $f$ is provided with a valve $f^2$ whereby said pipe $f$ may be closed at one side of the pipe $i$. The pipe $h$ has a valve $h'$ whereby the condenser may be shut off from the liquid receiver $d$.

The operation of the described apparatus is as follows: In freezing, the valves $c'$, $e'$, $f^2$, and $h'$ are opened, and the valves $i'$ and $j'$ are closed. The liquid therefore passes from the receiver $d$ to the bed $b$, and is expanded therein, the gas passing through the pipe $e$ to the compressor, and from thence in a compressed condition to the condenser, where it is condensed into a liquid form, and from which it is returned through the pipe $h$ to the receiver $d$, this being the usual freezing process. After the cake has been completed, it is liberated from the bed as follows: Some time previous to the completion of the freezing process, the valve $h'$ is closed, allowing the liquid ammonia to accumulate in the condenser. When sufficient liquid has accumulated, the valves $i'$ and $j'$ are opened, and the valves $c'$, $e'$, and $f^2$ are closed, so that the passage of liquid from the receiver $d$ to the bed, and the escape of gas from the bed to the pipe $e$ are prevented. Under this adjustment the conditions are reversed, the evaporation taking place, for the time being, from the coil $f'$ of the condenser, the liquid therein being under a high pressure and temperature resulting from the previous action of the compressor, said pressure and temperature causing ammonia steam or vapor to pass over through the pipe $i$ into the bed $b$, which, being at a very low temperature, becomes for the time being a condenser. The gas or vapor, having now no outlet through the pipe $e$, is condensed and rapidly liberates heat, which warms the bed and quickly cleaves the ice therefrom. The liquid of condensation passes through the pipes $c$ and $j$ to the upper portion of the receiver $d$.

It will be seen, therefore, that an apparatus embodying our invention comprises the usual parts of an organized apparatus of the class described, and has adjustable or variable connections, whereby under one adjustment the process of freezing may be carried on in the usual way, expansion taking place in the bed and condensation in the condenser; while under another adjustment the conditions are reversed, the expansion taking place in the condenser and condensation in the bed, the result being the speedy liberation of the cake from the bed, by a very simple adjustment of the apparatus. We have here shown a unitary form of the apparatus, involving but one tank and freezing bed. We propose, however, to employ a series of tanks the beds of which will all be connected to one compressor and one condenser. In such case the valve $f^2$ in the pipe $f$ will be omitted, as it will be desirable to keep said pipe continuously open, in order that while one or more tanks are in temporary disuse freezing may go on in the others. Moreover, when several beds are in use, the pipe $f$ will be always full of hot gas under high pressure from the operating beds, which gas is, therefore, always ready to rush into and condense within the cold inner surface of the bed upon the opening of the by-pass valve $v'$. When the bed is horizontally arranged and forms the bottom of the water space in the tank as here shown, it is preferably insulated from the bottom of the tank by a bed or layer $o$ of non-conducting material such as paraffine, which materially facilitates the freezing operation by concentrating the refrigerating action at the upper surface of the bed. We find by practice that this is a feature of much importance. The sides of the tank are here shown as provided with linings $o'$ of the same or a like material, which not only insulates the water and ice from the sides of the tank but prevents the ice from adhering to the tank.

We claim—

1. In an ice making apparatus comprising a sweet-water receptacle, an ice generating bed therein, a volatile liquid receiver, the lower portion of which is connected with said bed by a pipe having a shut-off valve, whereby the passage of said liquid to the bed may be prevented, a condenser connected with both the bed and receiver, and a compressor adapted to draw gas from the bed and force it under pressure into the condenser, the described improvement consisting in a shut-off device to prevent the escape or removal of gas from the bed, a closable connection or by-pass between the bed and a gas-containing portion of the apparatus, whereby gas or vapor at a relatively high pressure and temperature may be admitted to the bed to be condensed therein by the ice on the bed, combined with means for the drainage of the liquid of condensation from the bed into the receiver.

2. An ice making apparatus comprising a generating bed, a volatile liquid receiver below said bed, a closable connection between said bed and the lower or liquid-holding portion of the receiver, whereby the liquid may be conducted from the receiver to the bed, and a closable connection between the bed and the upper portion of the receiver, whereby liquid condensed in the bed may be returned to the receiver.

In testimony whereof we have signed our names to this specification, in the presence of two subscribing witnesses, this 20th day of January, A. D. 1894.

WM. LEE CHURCH.
SIDNEY A. REEVE.

Witnesses:
FREDK. E. MURPHY,
FRANCIS BLOSSOM.